United States Patent
Bryant et al.

(10) Patent No.: US 8,902,728 B2
(45) Date of Patent: Dec. 2, 2014

(54) CONSTRUCTING A TRANSITION ROUTE IN A DATA COMMUNICATIONS NETWORK

(75) Inventors: Stewart Frederick Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 13/546,971

(22) Filed: Jul. 11, 2012

(65) Prior Publication Data
US 2012/0275298 A1    Nov. 1, 2012

Related U.S. Application Data

(62) Division of application No. 11/968,499, filed on Jan. 2, 2008, now Pat. No. 8,238,232, which is a division of application No. 10/442,589, filed on May 20, 2003, now Pat. No. 7,330,440.

(51) Int. Cl.
| | |
|---|---|
| *H04L 29/14* | (2006.01) |
| *H04L 12/26* | (2006.01) |
| *H04L 12/703* | (2013.01) |
| *H04L 12/701* | (2013.01) |
| *H04L 12/705* | (2013.01) |
| *H04L 12/753* | (2013.01) |
| *H04L 12/751* | (2013.01) |
| *H04L 12/707* | (2013.01) |

(52) U.S. Cl.
CPC ............... *H04L 45/18* (2013.01); *H04L 45/28* (2013.01); *H04L 45/00* (2013.01); *H04L 45/48* (2013.01); *H04L 2212/0025* (2013.01); *H04L 45/02* (2013.01); *H04L 45/22* (2013.01)
USPC ............................ 370/217; 370/225; 370/254

(58) Field of Classification Search
USPC .................................................. 370/218–228
See application file for complete search history.

(56) References Cited

U.S. PATENT DOCUMENTS

| | | | |
|---|---|---|---|
| 5,243,592 A | 9/1993 | Perlman et al. | |
| 5,825,772 A | 10/1998 | Dobbins et al. | |

(Continued)

FOREIGN PATENT DOCUMENTS

| | | |
|---|---|---|
| CN | 1440159 A | 9/2003 |
| WO | WO 01/78278 A1 | 10/2001 |
| WO | WO 02/06918 A2 | 1/2002 |

OTHER PUBLICATIONS

European Patent Office, "Office Action" in application No. 06 720 965.0-1505, dated Apr. 25, 2013, 6 pages.

(Continued)

*Primary Examiner* — Huy D Vu
*Assistant Examiner* — Teisha D Hall
(74) *Attorney, Agent, or Firm* — Hickman Palermo Truong Becker Bingham Wong LLP

(57) ABSTRACT

A method is described of constructing a transition route in a data communication network having as components nodes and links. Upon receipt of a transition notification identifying a first component a non-neighboring node constructs a transition route around the first component. In an embodiment, a node performs detecting the first component transition; issuing a transition notification identifying the first component and recognizable by nodes configured to construct a transition route around the first component; and upon expiry of a notification transition period, issuing a transition advertisement recognizable by all nodes on the network.

15 Claims, 12 Drawing Sheets

(56) References Cited

U.S. PATENT DOCUMENTS

| | | |
|---|---|---|
| 6,032,194 A | 2/2000 | Gai et al. |
| 6,044,075 A | 3/2000 | Le Boudec et al. |
| 6,098,107 A | 8/2000 | Narvaez-Guarnieri et al. |
| 6,128,750 A | 10/2000 | Espy et al. |
| 6,148,410 A | 11/2000 | Baskey et al. |
| 6,185,598 B1 | 2/2001 | Farber et al. |
| 6,256,295 B1 | 7/2001 | Callon |
| 6,349,091 B1 | 2/2002 | Li |
| 6,356,546 B1 | 3/2002 | Beshai |
| 6,473,421 B1 | 10/2002 | Tappan |
| 6,507,577 B1 | 1/2003 | Mauger et al. |
| 6,704,320 B1 | 3/2004 | Narvaez et al. |
| 6,711,125 B1 | 3/2004 | Walrand et al. |
| 6,757,289 B1 | 6/2004 | Cain et al. |
| 6,778,531 B1 | 8/2004 | Kodialam et al. |
| 6,928,484 B1 | 8/2005 | Huai et al. |
| 6,996,065 B2 | 2/2006 | Kodialam et al. |
| 7,058,016 B1 | 6/2006 | Harper et al. |
| 7,158,486 B2 | 1/2007 | Rhodes |
| 7,349,427 B1 | 3/2008 | Canning et al. |
| 7,420,989 B2 | 9/2008 | Liu et al. |
| 2002/0037010 A1 | 3/2002 | Yamauchi |
| 2002/0093954 A1 | 7/2002 | Weil et al. |
| 2002/0112072 A1* | 8/2002 | Jain .............................. 709/239 |
| 2002/0131362 A1 | 9/2002 | Callon |
| 2002/0136223 A1 | 9/2002 | Ho |
| 2002/0169712 A1 | 11/2002 | Ginzborg et al. |
| 2002/0171886 A1 | 11/2002 | Wu et al. |
| 2002/0172157 A1 | 11/2002 | Rhodes |
| 2003/0079040 A1 | 4/2003 | Jain et al. |
| 2003/0117950 A1 | 6/2003 | Huang |
| 2003/0123457 A1 | 7/2003 | Koppol |
| 2003/0195922 A1 | 10/2003 | Andrews et al. |
| 2004/0001497 A1 | 1/2004 | Sharma |
| 2004/0001508 A1 | 1/2004 | Zheng et al. |
| 2004/0071089 A1 | 4/2004 | Bauer et al. |
| 2004/0151181 A1 | 8/2004 | Chu et al. |
| 2005/0013241 A1 | 1/2005 | Beller et al. |
| 2005/0038909 A1 | 2/2005 | Yoshiba et al. |
| 2005/0097219 A1 | 5/2005 | Goguen et al. |
| 2005/0265228 A1 | 12/2005 | Fredette et al. |
| 2006/0018253 A1 | 1/2006 | Windisch et al. |
| 2006/0221962 A1 | 10/2006 | Previdi et al. |
| 2008/0025203 A1 | 1/2008 | Tallet |
| 2008/0089227 A1 | 4/2008 | Guichard et al. |

OTHER PUBLICATIONS

Current Claims in application No. 06 720 965.0-1505, dated Apr. 2013, 5 pages.
State Intellectual Property Office of the People's Republic of China, "Third Office Action" in application No. 200880105670.2 dated May 10, 2013, 16 pages.
Current Claims in application No. 200880105670.2 dated May 2013, 2 pages.
Balon, Simon, "A Scalable and Decentralized Fast-Rerouting Scheme With Efficient Bandwidth Sharing", Computer Networks, Science Direct, Dated Jan. 31, 2005, 18 pages.
European Patent Office, "Supplementary European Search Report", application No. EP 04795045, May 27, 2009, 4 pages.
Claims, application No. EP 04795045, dated May 2007 4 pages.
Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.
State Intellectual Property Office of the People's Republic of China, "The First Office Action", filing No. 200680001652.0, May 8, 2009, 15 pages.
Claims, filing No. 200680001652.0, dated May 2009, 3 pages.
European Patent Office, "Supplementary European Search Report", application No. EP 06720965, dated Jul. 21, 2009, 6 pages.
Claims, application No. EP 06720965, dated Jul. 2009, 4 pages.
European Patent Office, "Communication pursuant to Article 94(3) EPC", Application No. 04795045.6-2416, dated Sep. 7, 2009, 5 pages.
Current Claims, Application No. 04795045.6-2416, dated Sep. 2009, 5 pages.
Office Action, Canadian Application No. 2,537,898 dated Feb. 15, 2010 (2 pgs).
Current claims for CA Application No. 2,537,898. Dated Feb. 2010, (6 pgs).
Moy, J et al., "OSPF Version 2", IETF Standard, Network Working Group, Internet Engineering Task Force, IETF, Apr. 1998, XP015008112, NFC 2328, 245 pages.
European Patent Office, "Supplementary Search Report", application No. EP 04812468, dated May 27, 2010, 4 pages.
Claims, application No. EP 04812468, dated May 2010, 4 pages.
CN 2nd Office Action CN application No. 200680001652.0 dated Oct. 27, 2010.
Current claims for CN application No. 200680001652.0., dated Oct. 2010.
European Office Action application No. 04812468.9, Applicant: Cisco Technology, Inc., dated Feb. 28, 2011 (6 pages).
Current claims for European application No. 04812468.9, Applicant: Cisco Technology, Inc., Feb. 2011 (6 pages).
Moy, J. "Network Working Group" Network Working Group, Ascend Communications, Inc., Internet Society, Dated Apr. 1998 (245 pages).
European Patent Office, Office Action for foreign patent application No. 06720965.0-1525, Applicant: Cisco Technology, Inc., dated May 2, 2011, 5 pages.
Current claims in for foreign patent application No. 06720965.0.-1525, Applicant: Cisco Technology, Inc. dated May 2011, 3 pages.
European Patent Offfice, Oral Hearing for foreign patent application No. 04795045.6-2416, Applicant: Cisco Technology, Inc., dated May 17, 2011, 4 pages.
The Patent Office of the People's Republic of China, Office Action received in foreign patent application No. 2004-80026214.0 dated May 10, 2011, 4 pages.
Current claims for Foreign Office Action in patent application No. 2004-80026214.0., 4 pages, dated May 2011.
European Patent Office, Office Action from EP for foreign patent application No. 08 798 837.4-1525, Applicant: Cisco Systems Inc., dated Jul. 1, 2011 (4 pgs).
Current claims in EP for foreign patent application No. 08 798 837.4-1525, Applicant: Cisco Systems Inc, dated Jul. 2011. (3 pgs).
Bryant, S. et al., "IP Fast Reroute Using Not-via Addresses", Network Working Group, Internet Draft, dated Jul. 2007, 24 pages.
Chinese Patent Office, CN Office Action received in International Application No. 200880105670.2 dated Dec. 23, 2011 (4 pages).
Current Claims, Application No. 200880105670.2, dated Dec. 2011, ( 3 pages).
S. Bryant et al., entitled "Internet Draft IP Fast Reroute Using Notvia Addresses" dated Mar. 2005 (13 pages).
AU Examiner's First Report for foreign patent application No. 2004311004 dated Jun. 23, 2008, 1 page.
AU Examiner's Second Report for foreign patent application No. 2004311004 dated Aug. 18, 2008, 1 page.
Current Claims for AU patent application No. 2004311004, dated Aug. 2008, 6 pages.
Office Action from CN for foreign application No. 200480033007.8, dated Apr. 11, 2008, 10 pages with English translation, 11 pages.
Current Claims for CN foreign patent application No. 200480033007.8, dated Apr. 2008, 6 pages.
The Patent Office of the People's Republic of China, "The Second Office Action", in application No. 200880105670.2, dated Oct. 10, 1012, 7 pages.
Current Claims in application No. 200880105670.2, dated Oct. 2012, 2 pages.
European Patent Office, "Office Action", in application No. 08 798 837.4-1525, dated Feb. 5, 2013, 8 pages.
Current Claims in application No. 08 798 837.4-1525, dated Feb. 2013, 3 pages.
Balon et al., "A Scalable and Decentralized Fast-Rerouting Scheme With Efficient Bandwidth Sharing" dated Dec. 2004, 21 pages.

(56) References Cited

OTHER PUBLICATIONS

Previdi, Stefano, "IP FAST ReRoute Technologies", Cisco Systems, dated 2006, 60 pages.
State Intellectual Property Office of the People's Republic of China, "The Fourth Office Action" in application No. 200880105670.2, dated Nov. 27, 2013, 4 pages.
Current Claims in application No. 200880105670.2, dated Nov. 2013, 2 pages.
European Patent Office, "Search Report" In application No. 04 812 468.9-1862, dated Aug. 8, 2014, 5 pages.
European Claims in application No. 04 812 468.9-1862, dated Aug. 2014, 5 pages.

* cited by examiner

CONSTRUCTING A TRANSITION ROUTE IN A DATA COMMUNICATIONS NETWORK

CROSS-REFERENCE TO RELATED APPLICATIONS; PRIORITY CLAIM

This application claims the benefit under 35 U.S.C. §120 as a Divisional of application Ser. No. 11/968,499, filed Jan. 2, 2008 now U.S. Pat. No. 8,238,232, which is a Divisional of application Ser. No. 10/442,589, filed May 20, 2003 now U.S. Pat. No. 7,330,440 the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to routing of data in a network. The invention relates more specifically to a method and apparatus for constructing a transition route in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB) which is a map of the entire network topology and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately.

As a result when a packet for a destination node arrives at a node (which we term here the "first node"), the first node identifies the optimum route to that destination and forwards the packet to the next node along that route. The next node repeats this step and so forth. In some circumstances it is desirable to have more control over the route that a packet takes in which case "tunneling" can be used. According to this scheme if a node A receives a packet destined for node Z and for some reason it is desired that the packet should travel via node Y, under normal circumstances node A would have no control over this (unless Y was an adjacent node), as the route is dependent on the forwarding table generated as a result of the SPF at node A and any intermediate nodes as well. However node A can "tunnel" the packet to node Y by encapsulating the received packet within a packet having destination node Y and sending it to node Y which acts as the tunnel end point. When the packet is received at node Y it is decapsulated and Y then forwards the original packet to node Z according to its standard forwarding table. Yet further control is available using directed forwarding in which the encapsulated packet includes a specific instruction as to which neighboring node of the end point of the tunnel the encapsulated packet should be sent, which comprises the "release point".

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

One solution for avoiding loops during a routing transition is described in co-pending patent application Ser. No. 10/323, 358, filed 17 Dec. 2002, entitled "Method and Apparatus for Advertising a Link Cost in a Data Communications Network" of Michael Shand (Shand), the entire contents of which are incorporated by reference for all purposes as if fully set forth herein. According to the solution put forward in Shand, when a node detects deactivation of an adjacent link or node, then instead of advertising the failure of the component, for example by simply removing the link from the LSP, the node that detects deactivation increments the associated link costs and advertises the incremented cost. As a result even when nodes have different LSDBs because of finite propagation and processing time of the LSP carrying the incremented link cost, loops are not set up in the remainder of the network. Once all nodes have updated their LSDBs, the detecting node increments the cost and advertises the incremented cost again. However in some circumstances it is desirable to converge on a common view of a network more quickly than is permitted by this incremental approach.

One alternative approach to dealing with link failure is described in document "Fortifying OSPF/IS-IS Against Link-Failure" by Mikkel Thorup ("Thorup") which is available at the time of writing on the file "1f_ospf.ps" in the directory "~mthorup\PAPERS" of the domain "research.att.com" on the World Wide Web. The approach of Thorup is to pre-compute the SPF at each node for each possible link failure. When a link failure is advertised the node forwards along its pre-computed updated path whilst updating the LSDB in the background.

Various problems arise with the approach. Thorup requires increased storage and computing to deal with all possible routes around all possible failures, as well as extra forwarding code requirements. Significantly Thorup does not address the problem of loop formation during a transition.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for constructing a transition route in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Transition Route
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method for constructing a transition route in a data communications network having as components nodes and links defining a network topology, around a first component. The method includes the step of receiving a transition notification and identifying the first component. The method further comprises the step of constructing a transition route around the first component from a non-neighboring node thereof to a target node. To construct the transition route a first set of nodes reachable from the non-neighboring node without traversing the first component is derived from the topology and a second set of nodes from which the target node is reachable without traversing the first component is derived from the topology. The transition route is constructed from the non-neighboring node to the target node via an intermediate node in an intersection of the first and seconds sets of nodes.

In other aspects, the invention encompasses a computer apparatus and a computer-readable medium configured to carry out the foregoing steps.

2.0 Structural and Functional Overview

Figure 1:
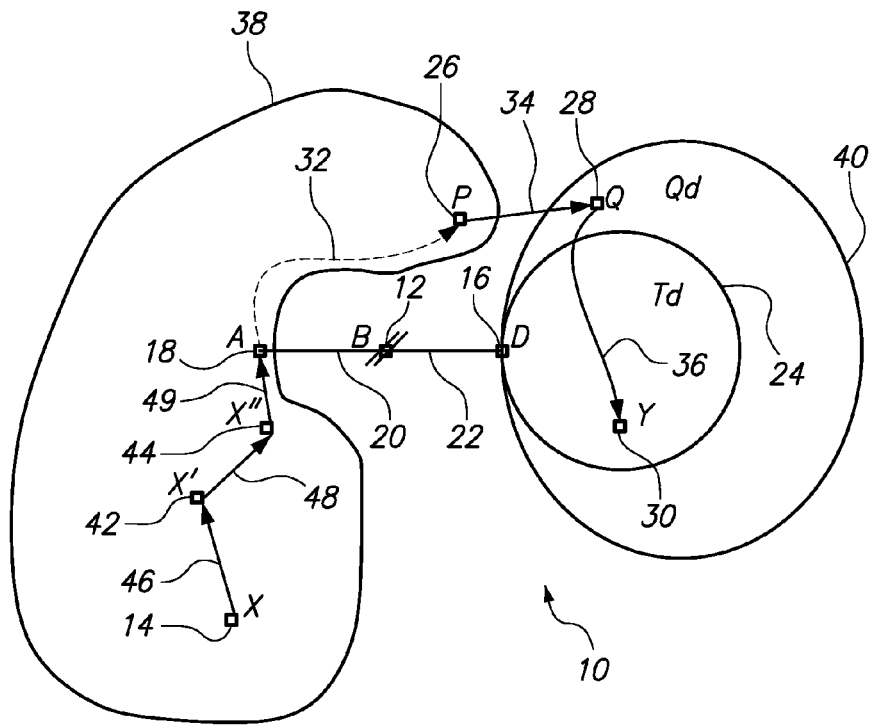
FIG. 1 is a representation of a network that illustrates an overview of a method for constructing a transition route.

The method can be further understood with respect to FIG. 1 which depicts an illustrative network diagram showing a method for constructing a transition route. The network comprises a data communication network of nodes and links, which can be the Internet or a sub-network such as a routing domain or a virtual network which is designated generally 10 and includes, as a first component, node B, reference number 12, as a non-neighboring node, node X, reference numeral 14 and as a target node, node D, reference numeral 16. Node B is untraversable, for example, because it has failed or because it has been withdrawn from service and as a result packets arriving at a neighbor node A, reference numeral 18, of failed node B cannot reach target node D via links 20 and 22 joining nodes A and B and B and D respectively, nor nodes that would normally be reachable via that path (referred to as the Td space 34).

However routes are available from node A in the form of backup routes or repair paths via node P, reference numeral 26, and node Q, reference numeral 28 to node Y, reference numeral 30, in the Td space of node A. The path from node A to node P is designated generally 32 and may, in practice, comprise a plurality of hops between nodes along the path. Nodes P and Q are joined by a link 34 and nodes Q and Y by path 36 which again may comprise multiple hops.

The manner in which the backup route is computed is described in co-pending patent application Ser. No. 10/340, 371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. In particular, node A computes a first set of nodes comprising the set (which can be termed the "P-space") 38 of all nodes reachable according to its routing protocol from node A, other than nodes reachable by traversing node B. Node A then computes a second set of nodes comprising the set of all nodes from which node D is reachable without traversing node B represented by space 40 (the "Qd-space"). In one embodiment the P-space and Q-space are pre-computed.

The method then determines whether any intermediate nodes exist in the intersection between P-space and Q-space or a one hop-extension thereof. For example in FIG. 1 nodes P and Q are within one hop of one another. As a result, in the event of the failure of node B packets of data can be sent from node A via path 32 as far as the intermediate node P then via link 34 node Q and thence via path 36 to the target node Y. The links 32, 34 and 36 can be viewed together as a "virtual" link forming a repair path in the event that node B fails or an alternative route is otherwise required.

Where appropriate the method in Miles et al. avoids packets being sent to the intermediate node X looping back to node A by tunneling the packet to node P. In that case the intermediate node P comprises the tunnel end point. Accordingly the initial repair path is formed by tunneling the packet destined to node Y from node A to node P, directed forwarding the packet from node P to node Q and then forwarding it normally from node Q to node Y.

All nodes pre-compute backup routes for all adjacent components as a result of which, as soon as a node detects deactivation of an adjacent component or otherwise needs an alternative route, that route is immediately available (although computation can alternatively be done in real time). As a result packet loss is minimized. Because the link state protocol is effectively undisturbed according to this method the fact that a repair path has been used is transparent to the remainder of the network. The labels "P-space", "Q-space" and "T-space" are arbitrary and used for convenience and other embodiments may use any other label for the respective sets of nodes.

In the system so far described, other routers in the network will forward packets as normal until the failure is advertised. Examples of such non-neighboring nodes in FIG. 1 are node X, reference numeral 14, node X', reference numeral 42 and node X", reference numeral 44. Node X, for example, forwards packets to target addresses in Td-space 24 via node X' X" and A and respective links 46, 48, 49. Once the packets are received at node A they will be forwarded along the repair path 32, 34, 36, but this will place a tunneling burden on the tunnel start and end points (nodes A and P respectively). Furthermore once the failure of node B is advertised by node A the processing and propagation time can give rise to loops as a result of the desynchronized LSDBs.

Figure 2:
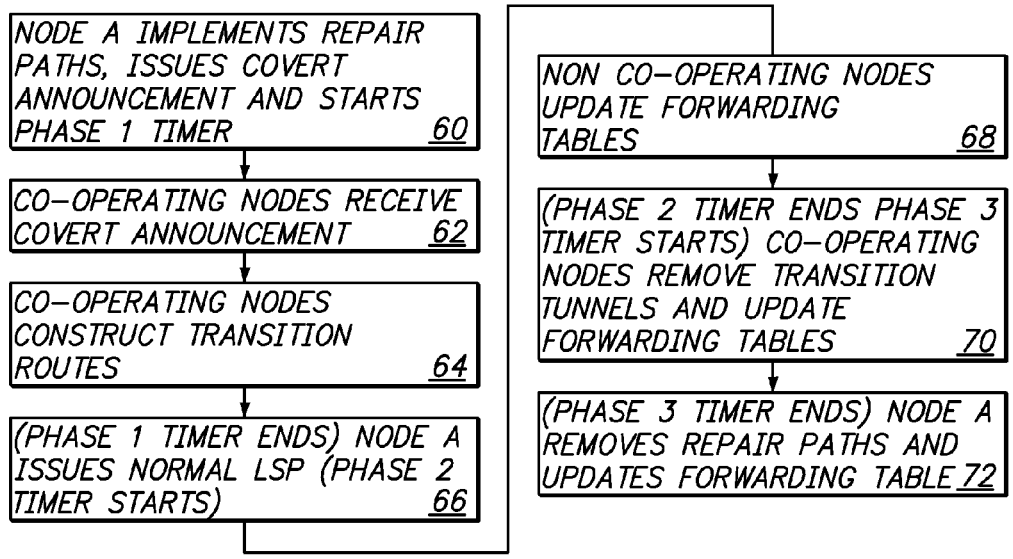
FIG. 2 is a flow diagram illustrating a high level view of a method for constructing a transition route.

FIG. 2 is a flow diagram illustrating a high level view of a method of constructing a transition route in a data communications network which addresses the looping problem, with reference to the network shown in FIG. 1. In block 60 node A implements its repair paths on detection of a failure, and issues a "covert announcement" or transition notification that the path AB is no longer available, signaling the start of phase 1, a notification transition period. The network is considered to be made up of cooperating nodes, that is nodes such as nodes X, X', X" that support the appropriate protocols for implementing the method described herein and non-cooperating nodes, that is, those which continue to operate and forward in a conventional manner during the routing transition. In block 62 the cooperating nodes receive and recognize the covert announcement (non co-operating nodes do not recognize the covert announcement but merely pass it on). In block 64 each cooperating node constructs its transition routes. In particular it calculates its respective P-space, that is, the set of nodes reachable according to its routing protocol other than nodes reachable by traversing node B, in exactly the same manner as node A calculates its P-space. In the same manner each cooperating node calculates Q-space, that is, the set of nodes from which the target node is reachable without traversing node B which will be the same irrespective of the identity of the calculating node. Once again, using the same techniques as node A, the cooperating node hence constructs and implements a set of transition routes.

Figure 3:
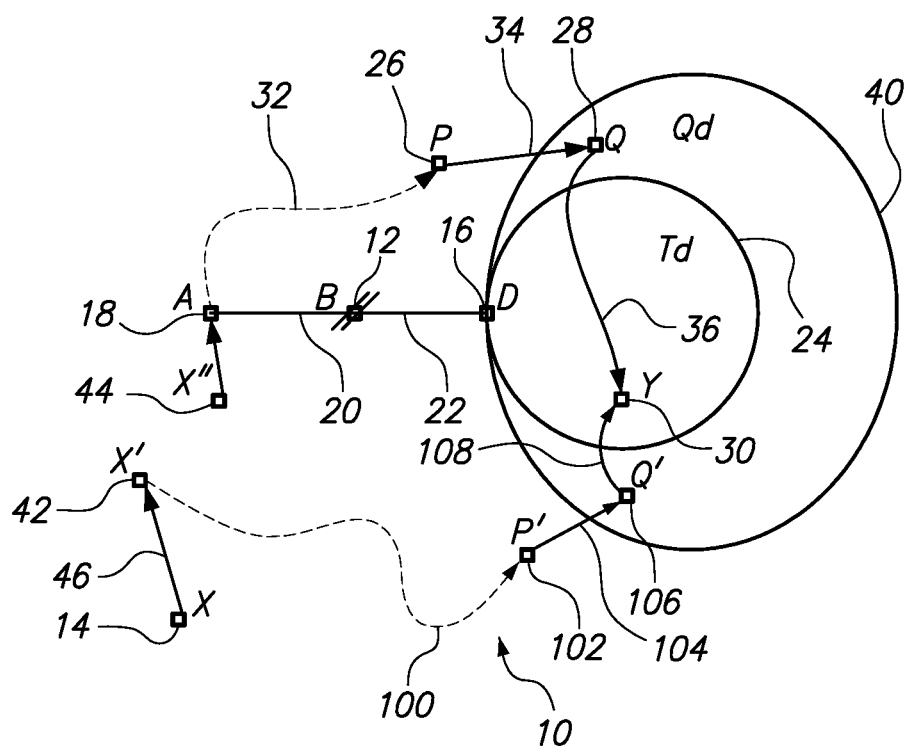
FIG. 3 is a representation of the network of FIG. 1 in which a repair path and transition route have been installed.

Referring to FIG. 3, which depicts an illustrative network showing a constructed transition route, it will be seen that a transition route from node X' to node Y runs via a path 100 which comprise multiple hops as appropriate to node P' in the P-space of X' and thence, via directed forwarding over link 104 to node Q' reference numeral 106, in Q-space and then via path 108 to node Y.

Referring to FIG. 2, in block 66, at the end of the phase 1 timer all transition tunnels are in place and being used as repair paths and node A issues a normal LSP describing the failure and starting phase 2, an advertisement transition period. All non-cooperating nodes, which up to now have been operating as though the failure had not occurred, process the LSP and update their forwarding tables in a conventional manner during phase 2. In block 70, the phase 2 timer ends and the phase 3 timer starts. During phase 3, a repair transition period, the cooperating nodes remove the transition tunnels and replace them with updated forwarding tables based on the normal LSP issued by node A notifying the failure. In an optimization the LSDB data for updating forwarding tables of the cooperating node, are updated during phase 2 such that fast implementation can be achieved. In block 72 the phase 3 timer ends and node A removes its repair paths.

As result of the method loops are almost entirely avoided and removed altogether once traffic reaches a co-operating router or if the network comprises only co-operating routers, and the transition is completed within a 3 phase time constraint which can be fixed in the system. For example in phase 1, while the cooperating nodes are setting up transition routes or tunnels designed to avoid loops, even though the non-cooperating nodes have not yet received notification of the failure, those packets that they forward towards node A will either be re-routed into node A's repair paths or will fall into a transition tunnel which has been set up at one of the cooperating nodes and hence be correctly forwarded to their destination without looping. As a result the order in which the cooperating nodes set up their transition routes is immaterial. During phase 1 cooperating routes only need institute transition routers for destinations reached via the failed component.

In phase 2, even though the non-cooperating nodes are updated asynchronously as the failure notification LSP floods through the network the possibility of loop formation is minimized. This is because any packets introduced into a tunnel from a cooperating node in phase 1 will remain in that tunnel and any packets subsequently traversing a cooperating node in phase 2 will be introduced into a transition tunnel which in either case will repair around the failure even if the repair path transits a non co-operating node. As a result the only loops that will be created are for packets entering the network through, or originating at, non-cooperating nodes during phase 2, with no cooperating nodes in the potential loop. Yet further, the institution of transition routes takes the encapsulation and decapsulation burden off the tunnel start and end points in A's repair paths providing a distributed repair strategy.

Various optimizations are available. For example transition routes only need to be instituted in those circumstances when the next hop will change as a result of the failure or the next hop does not change but is a non-cooperating router. Furthermore cooperating nodes can skip phase 2 altogether if the new next hop is a co-operating router. As a result the method is yet quicker and requires less calculation. The method and its optimizations are discussed in more detail below.

3.0 Method of Constructing a Transition Route

The method described herein can be implemented according to any appropriate routing protocol whereby a node in a network has sufficient information to predict the forwarding behavior of other nodes in a stable network. Generally, link state protocols such as Intermediate System to Intermediate System (IS-IS) or Open Shortest Path First (OSPF) are appropriate protocols. Link state protocols of this type will be well understood by the skilled reader and are not described in detail here.

As discussed in the Structural and Functional Overview, the cooperating routers install transition tunnels or routes upon receipt of a covert notification. The transition routes are constructed in the same manner as the repair paths from node A which is described in more detail in Miles et al. but for the purposes of completeness the principal points are described here.

In order to construct a backup route from a node X a spanning tree is computed rooted at node X. Those nodes reachable via the failed component (node B) are excised, including nodes that, because of an equal cost path split (i.e. two possible paths with equal cost) could be reached by traversing the failed component. The excised nodes are easily identified by running an SPF algorithm and setting a flag in the data structure when the failed component is explored, propagating that flag to all nodes reached via that component. In an optimization, in order to accommodate directed forwarding, the spanning tree, is extended to include as reachable nodes any nodes that are one hop away from a node already in the set to allow directed forwarding. Additional hops can be added if an appropriate encapsulation regime is supported.

The Q-space 40 is constructed in a similar manner. Where the failed node B has a single downstream neighbor node D, as shown in FIG. 1, the reverse spanning tree (or "sink tree") is computed showing the routes for each node from which node D is reachable, again excising all nodes from which node D is reached via the failed node B. In the case of multiple downstream neighbor nodes, the Q-space is derived for each of them. It will be appreciated that instead of extending the P-space to include additional nodes one hop away, Q-space can be extended instead, in conjunction with directed forwarding. In addition it would be possible to run the SPF algorithm to obtain P and Q-space in any order. In some instances it will not be necessary to construct a Q-space as the target node is found in P-space—this is more likely to happen for non-neighboring nodes.

As a result the respective release points from node X to node D can be obtained from the intersection of the respective (extended) P-space and Q-space sets.

Computation of the Q-space is dependent on whether a potential node failure or a potential link failure is being considered. If it is a potential link failure then it is enough to ensure that a repair path is constructed around a link to the node the other side of it (node B as target node) after which traffic would be forwarded normally. However if node B failed then clearly this approach would not work. In that case it would be necessary to construct a repair path to each node neighboring the failed node (other than the node A itself of course) on the basis that the failed node would have forwarded the traffic to its neighboring nodes in any event, and the neighboring nodes would then normally forward packets irrespective of how the packet reached them. It will be seen that the worst case scenario is node failure rather than link failure and so this scenario is principally addressed here.

Figure 4A:
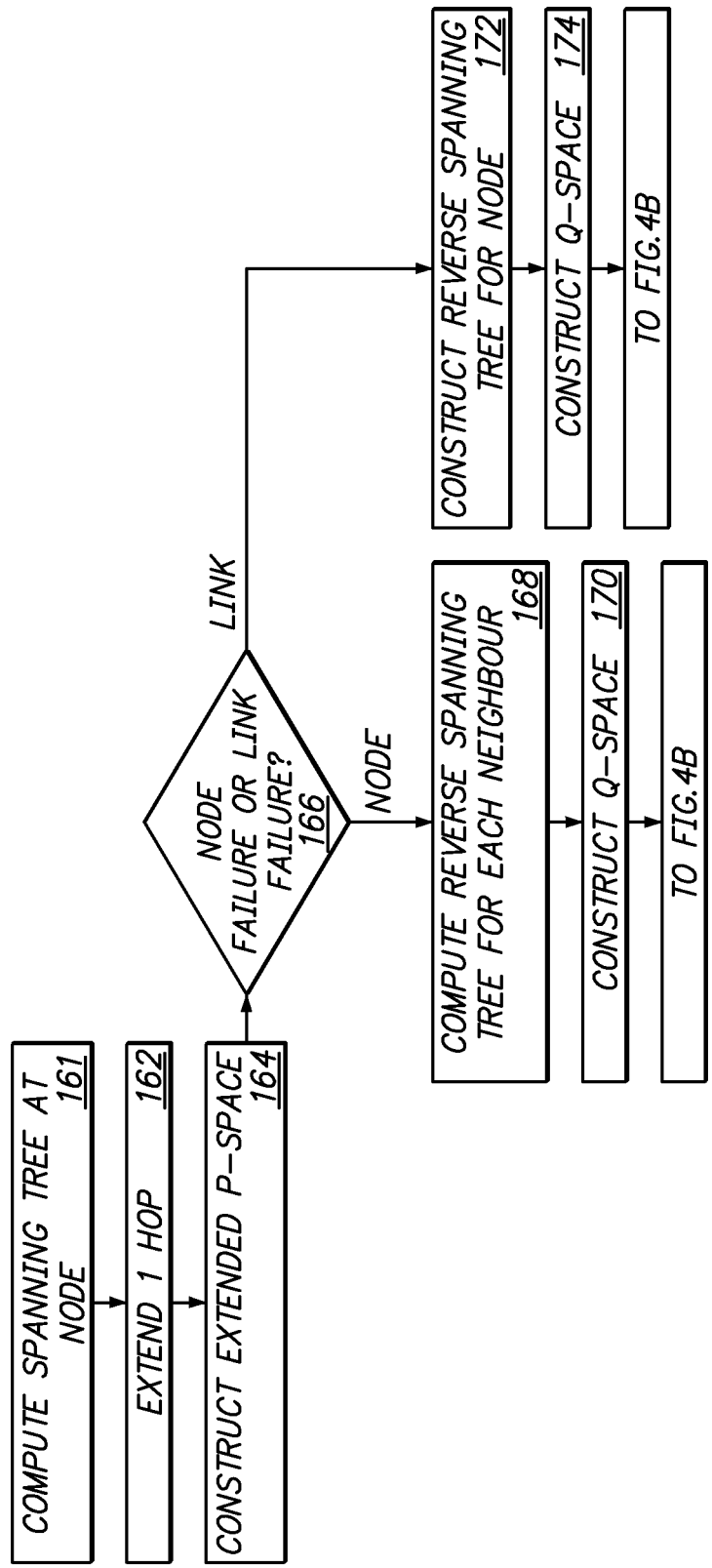
FIG. 4A is a flow diagram illustrating in more detail steps involved in constructing a transition route.
Figure 4B:
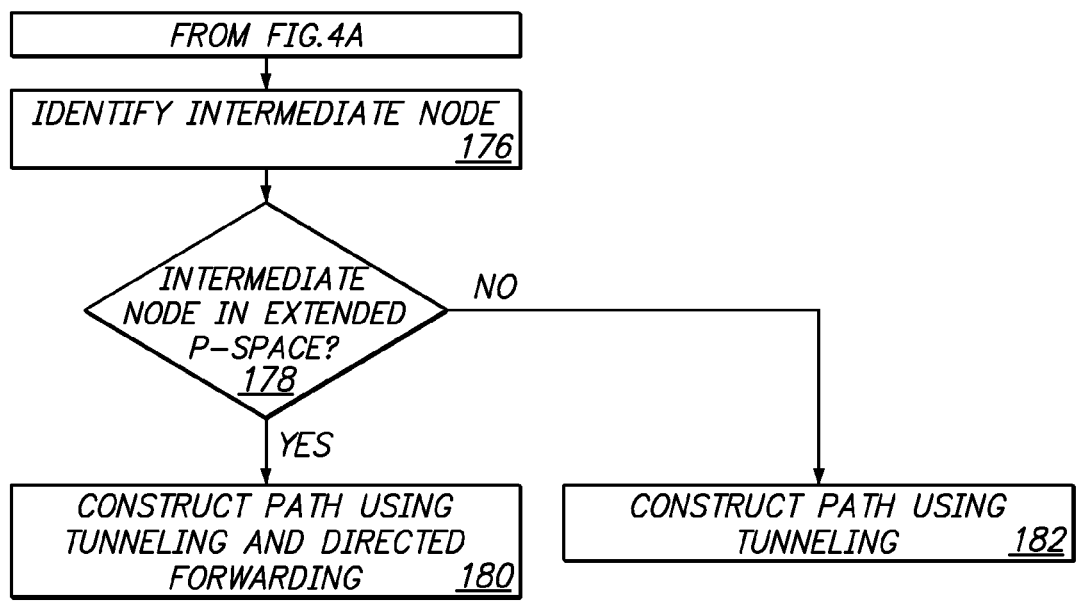
FIG. 4B is a continuation of FIG. 4A and is a flow diagram illustrating in more detail steps involved in constructing a transition route.

FIGS. 4A and 4B are flow diagrams illustrating in more detail the method for constructing a backup route. In block 161 the spanning tree from the respective node (e.g. node X) is computed excluding nodes reached by traversing the adjacent component. In the optimization discussed above the set of nodes obtained is extended by one hop in block 162 and an extended P space is constructed in block 164. The backup or transition route constructed is then dependent upon whether node failure or link failure is addressed as represented by option block 166. If node failure is addressed then at block 168 the reverse spanning tree is computed for each neighbor of the failed node excluding nodes from which the neighbor is reachable via the failed node. In block 170 the Q space is constructed. If, at block 166, link failure is addressed then at block 172 the reverse spanning tree is computed for the node adjacent the failed link excluding nodes from which the adjacent node is reachable via the failed link. In block 174, once again, the Q space is constructed.

Turning to FIG. 4B, whichever failure type is addressed at block 166, at block 176 the intermediate node is identified from the intersection between P and Q space. In block 178 it is then assessed whether the intermediate node is in the extended P space. If it is then at block 180 the transition route is constructed using tunneling and directed forwarding to the intermediate node. If the intermediate node is not in extended P-space then the transition route is constructed at block 182 using tunneling to the intermediate node as discussed above.

In block 164 the P-space for node X can be extended very simply by calculating the P-space for the neighbors to node X, which again can be calculated at node X from its LSDB. Because node X will inevitably forward packets to one of these neighbors in the event that link 36 or node B fails, the set of reachable nodes and hence potentially, release points can be simply extended in this manner. It can be shown that the P-space can be derived individually for each neighboring node of a failed node or by running an SPF algorithm rooted at X but decreasing the cost of nodes reachable over the neighboring node by an amount comprising the cost of the direct link between the nodes less the sum of the shortest cost link in each direction (bearing in mind that the direct link may not be the lowest cost link, and that there may be asymmetry). As a result individual SPFs rooted at each node do not need to be run.

If multiple repair paths are available (i.e. more than one pair of tunnel endpoint and release points are identified in the intersection of P-space and Q-space) then the optimum repair path is selected on a least cost basis, based on the cost to the release point (or tunnel endpoint if these are coincident). In the present example, the cost is the cost of the path that packets will actually traverse via the release point including the cost of a new link over which directed forwarding is performed as this represents a lower computational burden and may be more representative than, say, the cost to the target via the repair path. However the selection process can be optimized by stopping running the Q-space reverse SPF as soon as a node in the (extended) P-space is identified. Although this may not find the shortest route this is outweighed by the reduced computational burden. A yet further optimization is to ensure that no downstream path (i.e. intermediate nodes comprising a neighbor of the repairing node and hence not requiring a tunnel) is excluded. This is achieved by stopping running the reverse SPF algorithm at the earlier of:

having reached all neighbors of the repairing node via the failed link (in which case there can be no downstream path as these neighbors will hence not occur in Q-space) and having identified another release point; and having reached a neighbor of the repairing node not via the failed link. Of course any appropriate manner of identifying the optimum repair path can be adopted.

Once the least cost repair path is assigned, there may still be multiple repair paths, one for each neighbor of the failed component which is a repair path target. To identify which repair path should be used it is necessary to assess the final destination of an incoming packet to the repairing node. This is achieved by recording which neighbor node would be used to reach each destination via the failed component in normal operation and assigning the traffic to the repair path generated with the appropriate neighbor as target. Of course any destination, not reachable via any of the neighbor nodes, will not require a repair path (as they do not traverse the failed component).

Referring to FIG. 1 the adjacent component that fails is for example link 20 and it is assumed that node B has not failed or otherwise been de-activated. Accordingly it is simply necessary to calculate a repair path from repairing node X with target node B rather than from node X to the neighbors of node B as target nodes. As discussed in more detail below, the nature of the failure can be assessed at node A. This is advantageous because node A can then advertise the information together with the covert announcement.

In order to establish whether the failure is a link failure or a node failure, any appropriate failure detection mechanism can be adopted, for example as described in co-pending patent application Ser. No. 10/346,051, filed 15 Jan. 2003, entitled "Method and Apparatus for Determining a Data Communication Network Repair Strategy", of Stewart Bryant et al., (Bryant et al.), the entire contents of which are incorporated by reference for all purposes as if fully set forth herein. According to the solution put forward in Bryant et al, and referring to FIG. 1 hereof, when a node A ("the detecting node") detects a failure along an adjacent link which may be the link itself or the node to which it is connected, the detecting node implements a repair path around the link to node B as discussed in more detail above, sends a loop detection packet along the repair path and starts a timer with period t. The detecting node monitors for receipt of a packet. If the received packet is an acknowledgement from node B then evidently node B has not failed and the link repair strategy can be maintained. If, however, the received packet is the loop detection packet this implies that node B has failed and the loop detection packet has looped back to the detecting node via another node that has noticed that node B has failed. In those circumstances a node repair strategy is implemented. If the timer times out without the detecting node receiving any packet, because of severe congestion, then it is assumed that there is node failure and the node failure strategy is invoked. In either case the nature of the failed component is announced together with the covert announcement.

Figure 4C:
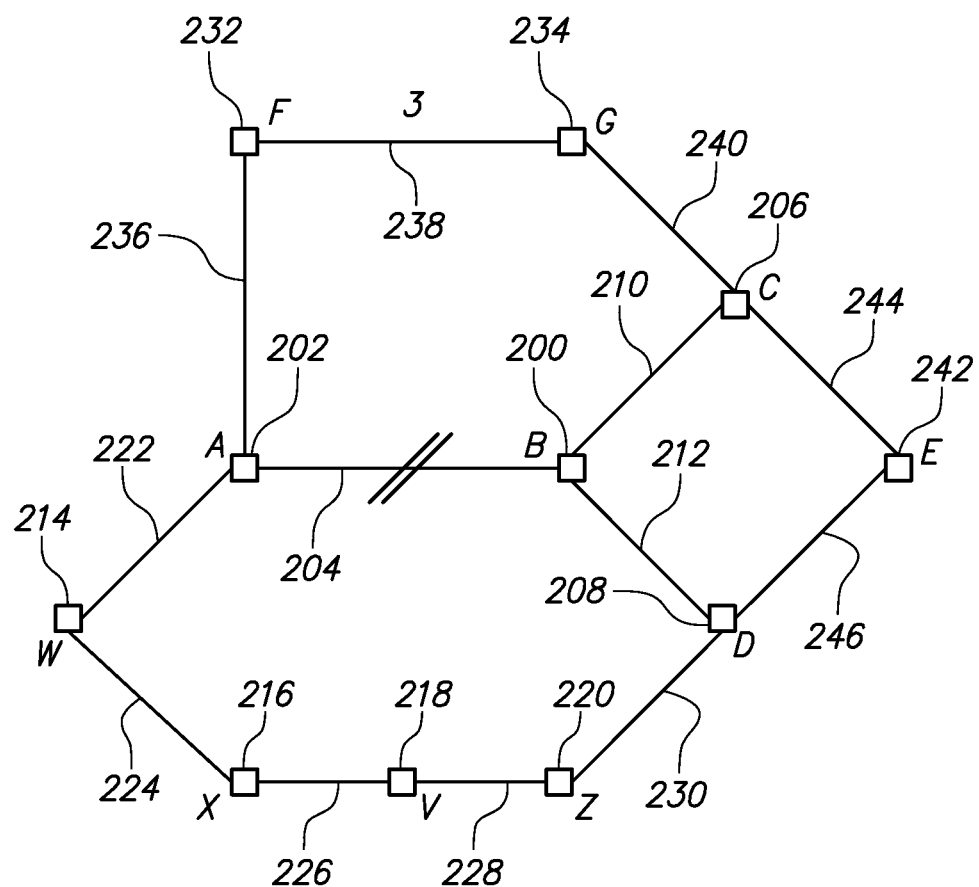
FIG. 4C is a representation of a network that illustrates in more detail the steps involved in constructing a transition route.

An illustrative example of a manner of constructing transition routes as described above is set out with reference to FIGS. 4C to 4I. FIG. 4C shows a network diagram of an illustrative network including node B, the component to be traversed, reference 200, a neighboring node A, 202 and a link 204 joining them. Node B has two further neighbor nodes, nodes C and D reference numbers 206, 208 respectively joined by respective links 210, 212. Node A has an alternative path to node D via nodes W, X, V and Z, 214, 216, 218, 220 respectively and corresponding links 222, 224, 226, 228 and 230. Node A also has an alternative path to node C via nodes F and G, 232, 234 and corresponding links 236, 238, 240. Node E, 242, is reachable by either node C or node D by respective links 244, 246. All of the links have a cost 1 except for link 238 between nodes F and G which has a cost 3. As an example, transition routes will be calculated originating at nodes X and F around node B.

Figure 4D:
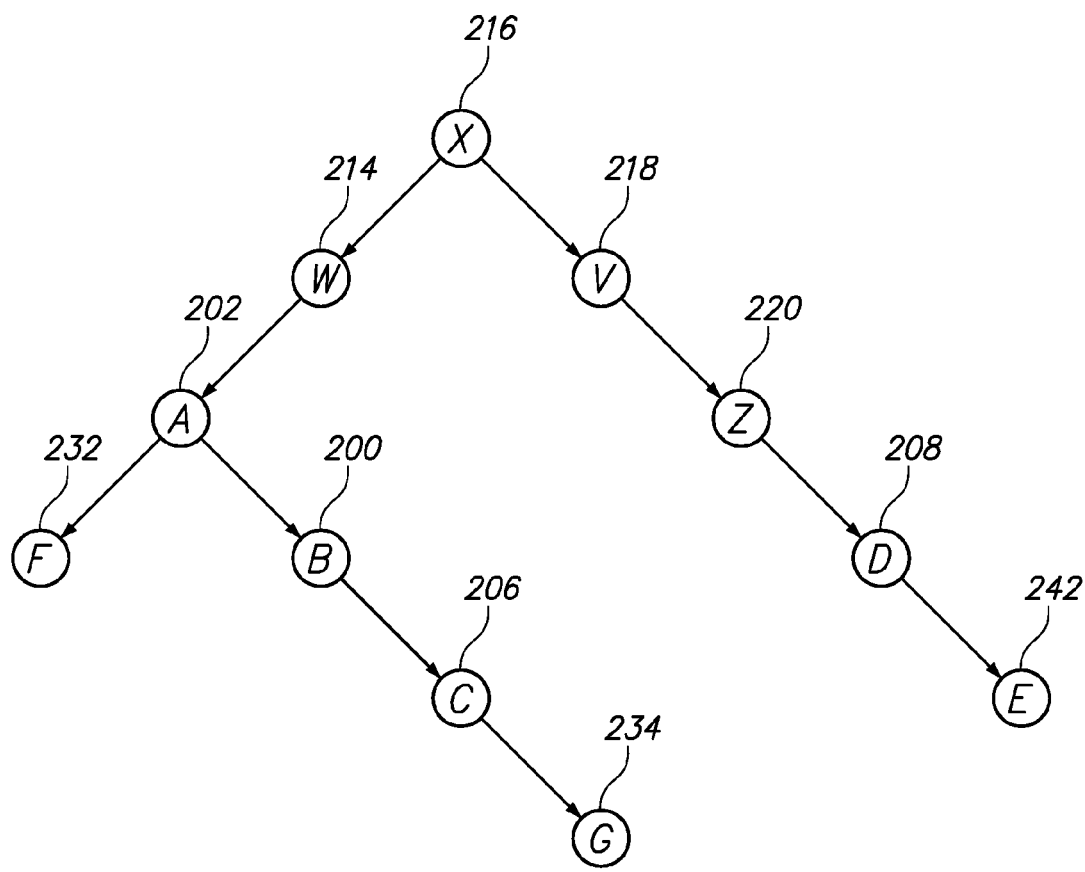
FIG. 4D is a spanning tree diagram for a node in the network shown in FIG. 4C.

FIG. 4D is a spanning tree diagram routed at node X showing the shortest path to each of the nodes. Those nodes reachable via the failed component are shown shaded gray, namely nodes B, C, G. It will be seen for example that node G is reachable via nodes B and C rather than via node F because of the high link cost between nodes F and G.

Figure 4E:
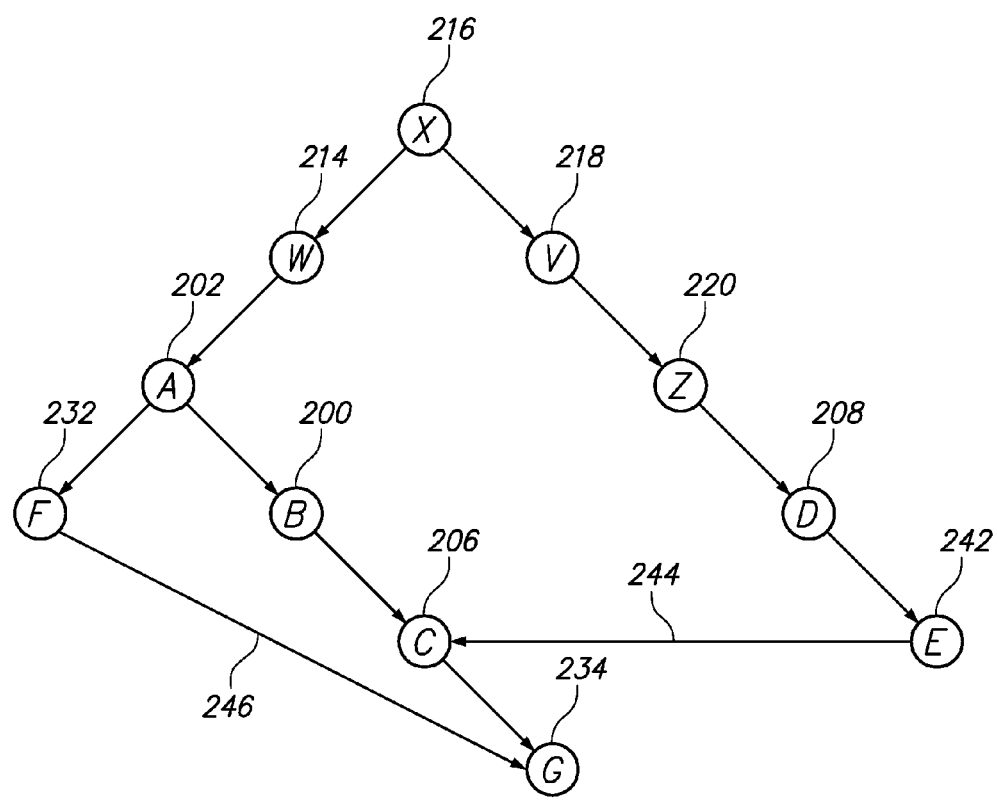
FIG. 4E shows the spanning tree diagram of FIG. 4D with directed forwarding.

FIG. 4E is a spanning tree diagram routed at node X but in addition showing directed forwarding. In particular node C is within one hop of node E (represented by arrow 244) and node G is within one hope of node F (represented by arrow 246). Accordingly it will be seen that the extended P-space for node X comprises the set of potential release points:

{ACDEFGWXVZ}

Of these nodes A, D, E, F, W, X, V, Z comprise tunnel end points whereas node C and G require directed forwarding from nodes E and F respectively.

Figure 4F:
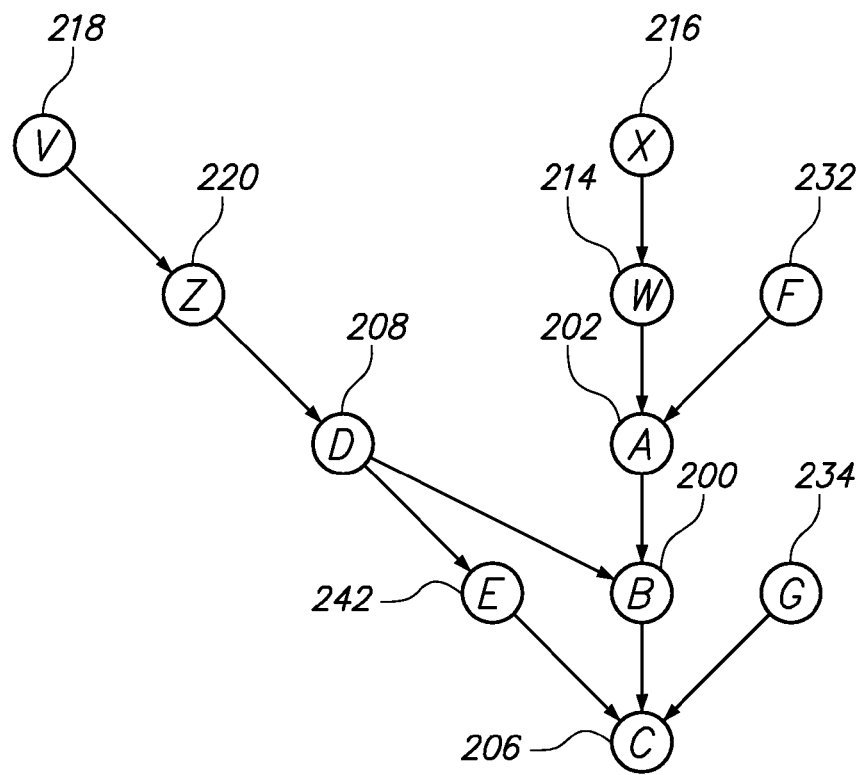
FIG. 4F is a reverse spanning tree diagram for a node in the network diagram of FIG. 4C.

Assuming node failure of node B it is necessary to calculate transition routes via each of its neighbors C and D (node A which notified the failure to the cooperating router X in the first place is excluded). FIG. 4F is a reverse spanning tree diagram computed for node C and it will be seen that nodes V, Z, D, X, W, A, B and F are shown shaded meaning that node C is reached from those nodes via node B. Although nodes V, Z and D could reach node C via node E, because there is an equal cost path split at node D such that there is an equivalent cost via E or via B, nodes V, Z and D are excised. Accordingly the Q-space is:

{CEG}

It is not necessary to construct a reverse spanning tree from node D because it is directly reachable from X as shown in FIG. 4E. Accordingly the set of potential release points is the intersection of X's P-space and Q-space:

{ACDEFGWXVZ}∩{CEG}={CEG}.

From inspection of FIG. 4C, nodes E and G are the lowest cost, with cost 4, but as directed forwarding is required to node G, the best release point is node E which hence comprises the intermediate node.

Figure 4G:
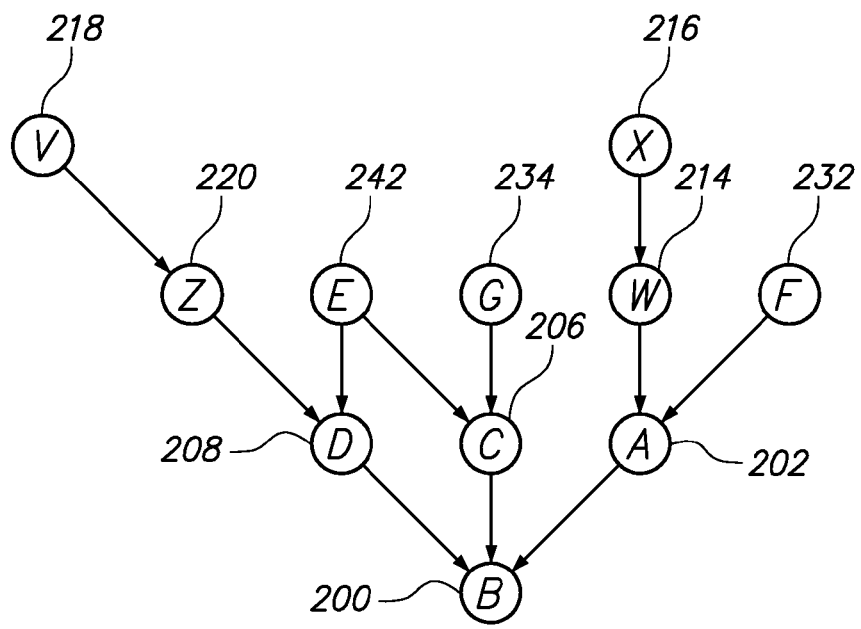
FIG. 4G is a reverse spanning tree for another node in the network diagram of FIG. 4C.

If it is detected that the link 204 in FIG. 4C has failed and not node B then a link repair strategy is required in which case the reverse spanning tree from node B must be computed. FIG. 4G is the reverse spanning tree diagram from node B from which it can be seen that nodes A, W, X and F are shown shaded as packets from these nodes would have reached node B over the failed link 204.

In this case, therefore, the intersection of X's P-space with B's Q-space is:

{ACDEFGWXVZ}∩{BCDEGVZ}={CDEGVZ}.

The lowest cost is node V which can be reached by first hop directed forwarding (that is, the packet from node X is direct forwarded to node V after which it will proceed by normal forwarding to node B without tunneling being required.

Figure 4H:
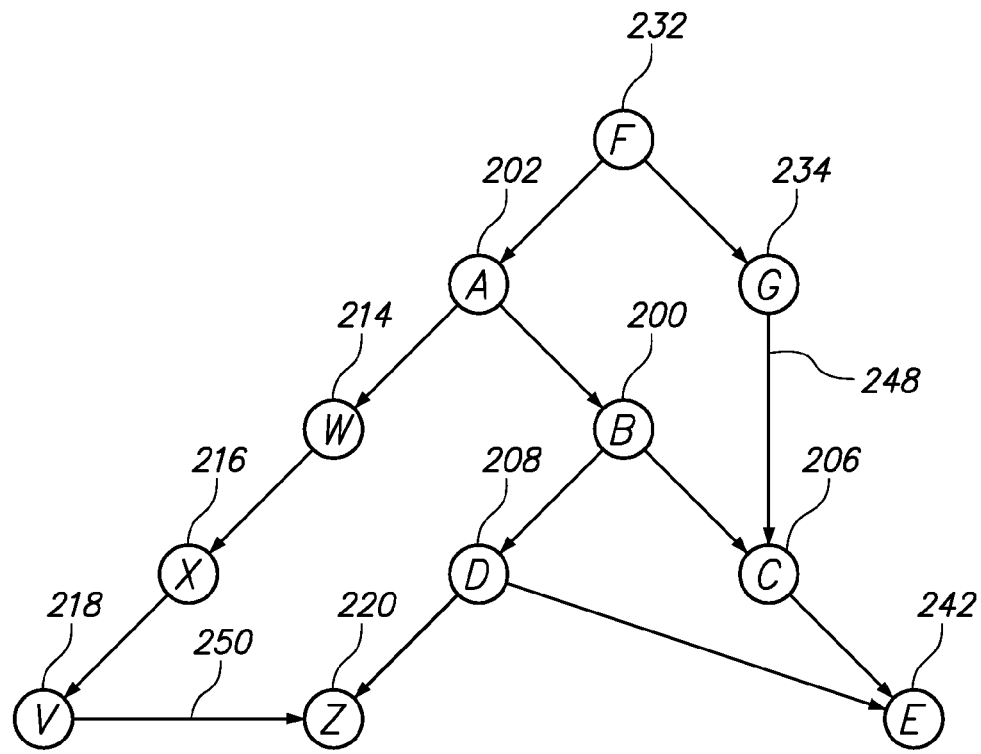
FIG. 4H is a spanning tree diagram for another node in the network shown in FIG. 4C.
Figure 4I:
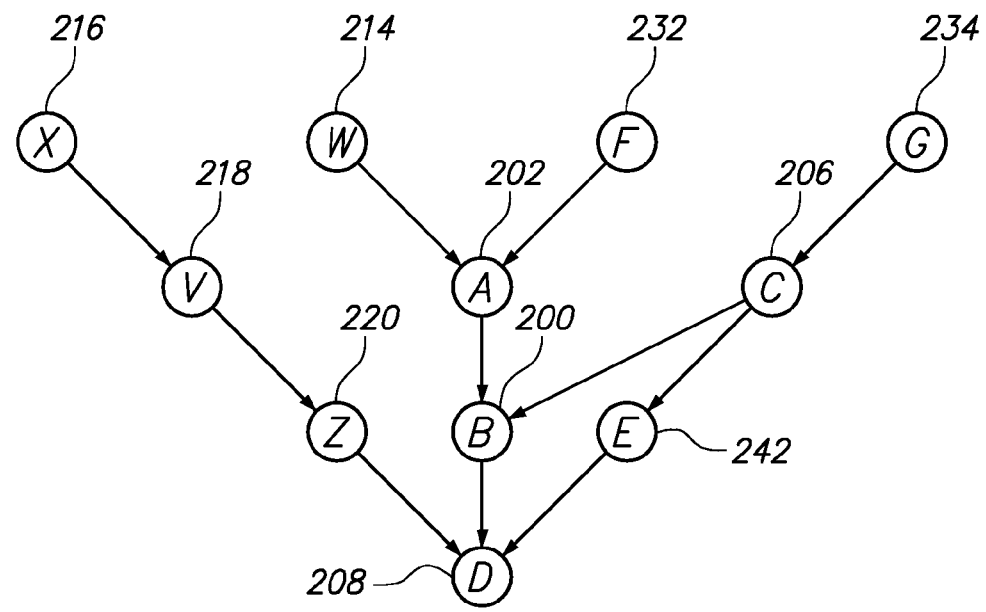
FIG. 4I is a reverse spanning tree diagram for another node in the network diagram of FIG. 4C.

FIG. 4H shows the extended spanning tree rooted at node F. The excised nodes are shown shaded and comprise nodes B, D and E, nodes C and Z being reachable from nodes G and V respectively as shown by respective arrows 248, 250. As node C is reachable it is only necessary to consider the reverse spanning tree routed at D. FIG. 4I is a reverse spanning tree diagram for node D and it will be seen that the excised nodes shown shaded are nodes A, B, C, F, G and W.

Accordingly the intersection of F's P-space with D's Q-space provides the set of achievable release points:

{ACFGWXVZ}∩{DEXVZ}equals{XVZ}.

In the case of link repair from node F the set of nodes that can reach node B without traversing the link A, B is {BCDE-GVZ}. The intersection of the set with router A's set of achievable release points is:

{ACFGXWXVZ}∩{BCDEGVZ}={CGVZ}.

Accordingly this intersection provides the potential intermediate release points from node F in the case of link failure of link 204 in FIG. 4C.

To illustrate implementation of the techniques described above, in the context of the illustrative network shown in FIG. 1, node X, in an attempt to reach node Y calculates its P-space by computing its spanning tree and excising all nodes reachable via node B. It then calculates Q-space comprising all nodes from which node D is reachable without traversing node B. Either P-space or Q-space is extended by one hop and the intersection found to identify the intermediate node. Packets are tunneled to the intermediate node and, if appropriate, directed forwarded. Once they reach node D then they will be forwarded on to Y by normal forwarding. It will be noted that node X only needs to calculated transition routes for nodes reached via the failed component (i.e. the Td-space) as otherwise the route will be via components that do know about failure and will route around it, or do not know about the failure, but would route around it in any event.

Figure 5:
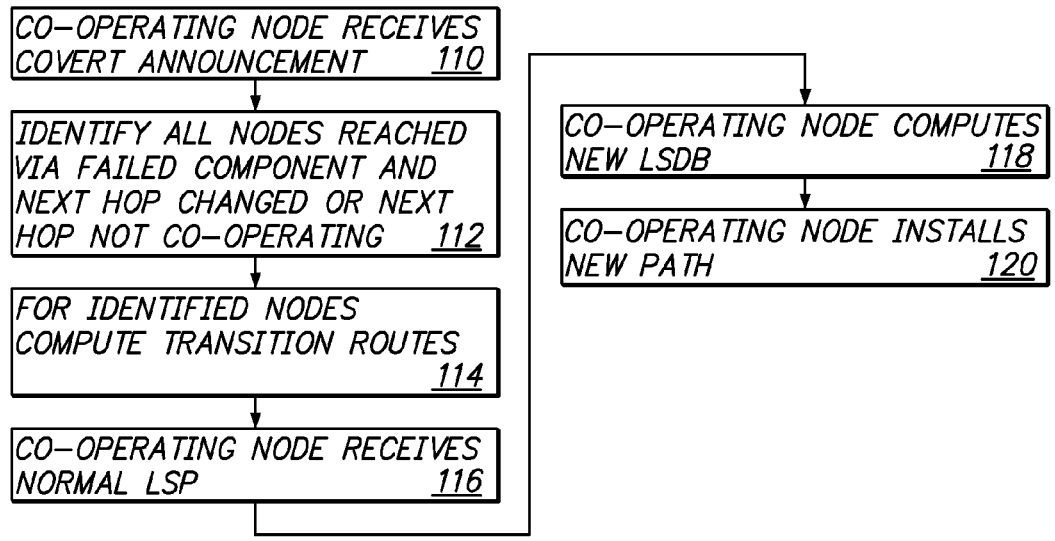
FIG. 5 is a flow diagram showing in more detail a transition management strategy.

FIG. 5 is a flow diagram illustrating in more detail a method for constructing a transition route. In particular FIG. 5 illustrates the steps taken by a cooperating node in constructing a transition route. In block 110 the cooperating node receives a covert announcement identifying a failed or otherwise untraversable component. At block 112 the cooperating node identifies all nodes for which a destination node is reached via the failed components and either for which the next hop will change as a result of the failure or the next hop does not change but is a non-cooperating router. In block 104, for all of the identified nodes transition routes are computed as discussed above. It will be noted that this approach is an optimization—transition routes could be computed for every possible destination node. However, as discussed above, there is evidently no need to compute transition routes for nodes whose normal routing path is unaffected by the transition. Indeed if no traffic was flowing over the failed component prior to its failure there would be no need to implement any transition tunnels.

Furthermore, if, for a given destination node, the next hop from the cooperating node does not change as a result of the transition, and that next hop is a cooperating router, there is no need to install the transition route. This is because the packet will be forwarded to the next hop cooperating router which will either know about the failure in which case it will have instituted its own transition strategy, or will not know about the failure in which case it will continue to forward the packet towards the failed component. As the neighboring node to the failed component (node A in FIG. 1) has implemented a repairing strategy, then even if the packet reaches node A it will be safely re-routed.

Figure 6:
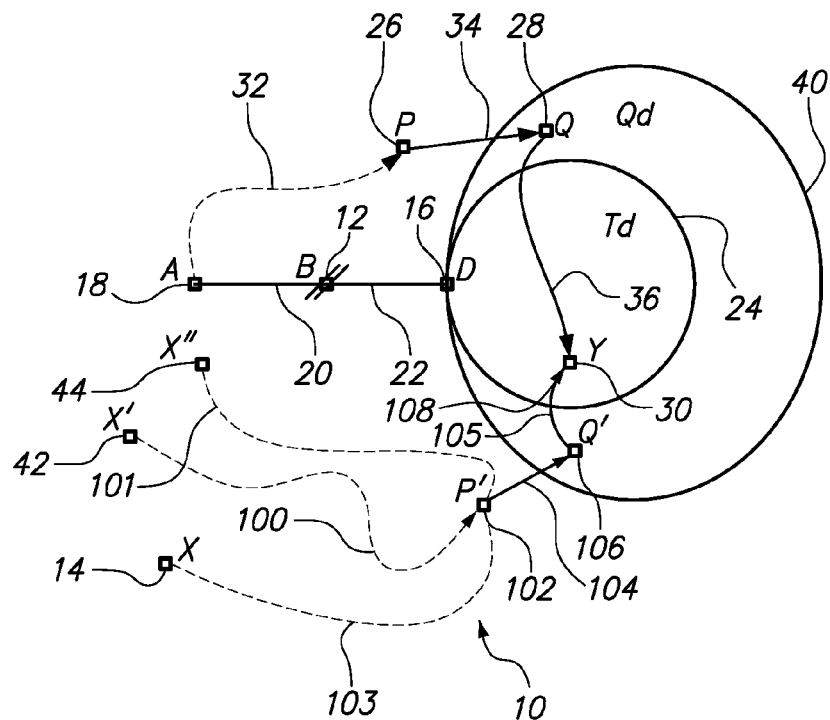
FIG. 6 is a representation of the network of FIG. 1 showing full installation of transition routes and repair paths.

Not all cooperating nodes will install transition routes simultaneously. Referring for example to FIG. 3 it will be seen that node X' has instituted a transition route 103, 104, 108, but nodes X and X" have not yet, and continue to forward normally. Referring however to FIG. 6 which depicts an illustrative network diagram representing the network of FIG. 1, at the end of phase 1 with all transition routes installed, it will be seen that X and X" have installed respective routes 103, 101 to P'. For simplicity a single P' and Q' are shown but it will be appreciated that multiple tunnel end points and release points may be determined for different cooperating nodes and different destinations.

The manner in which the relevant nodes are identified is optimally by identifying the IP address prefixes for the respective destination nodes that meet the conditions in block 112, computing the transition tunnels needed by the prefixes and assigning the prefixes to the respective transition tunnels, allowing a simple forwarding mechanism.

Reverting to FIG. 5, in block 116 the cooperating node receives a normal LSP advertising the failure. The normal LSP is issued at the termination of a network wide phase 1 timer, of sufficient duration to ensure that all the cooperating nodes install their transition routes. In an alternative embodiment the normal LSP is issued when the issuing node (usually a neighbor node to the failed component) otherwise ascertains that all cooperating routers have completed installation of transition routes for example upon receipt of appropriate acknowledgement packets from each cooperating node, optionally instigated by a request packet from the issuing node.

In block 118, at the beginning of the phase 2 timed period the cooperating nodes, in an optimization, compute their new LSDB based on the failure notification but do not update their forwarding tables. During phase 2 the non-cooperating nodes in the network update their forwarding tables on the basis of the LSP announcing the failure in the conventional manner.

In block 120, at the end of the phase 2 timer the cooperating nodes remove their transition routes and update their forwarding tables with the pre-computed converged routes. Alternatively the converged routes can be calculated at the end of phase 2. In either case the converged routes can be computed based on the covert announcement or the normal LSP. The order in which the cooperating nodes replace their transition routes with the new paths is again immaterial. The phase 2 timer ensures that any non-cooperating routers have updated their forwarding tables. However in an optimization a cooperating node can proceed directly to the end of phase 2 in relation to certain destinations on time out of phase 1 if the next hop in the new path to the destination is to a cooperating node, as in that case it will be possible to rely on the transition strategy of the next hop. The phase 1 timer ensures however that transition tunnel withdrawal cannot start until all transition tunnels are installed. In block 120 all cooperating nodes, accordingly, install their new paths at the end of the phase 1 or phase 2 timer as appropriate. It is of course possible that more than one neighboring node detects the failure and issues a covert announcement. In that case the phase 2 timer should not start until overt announcements advertising the failure are received from all of the detecting nodes as otherwise the cooperating nodes could begin to withdraw their transition tunnels too early which could give rise to loops.

Figure 7:
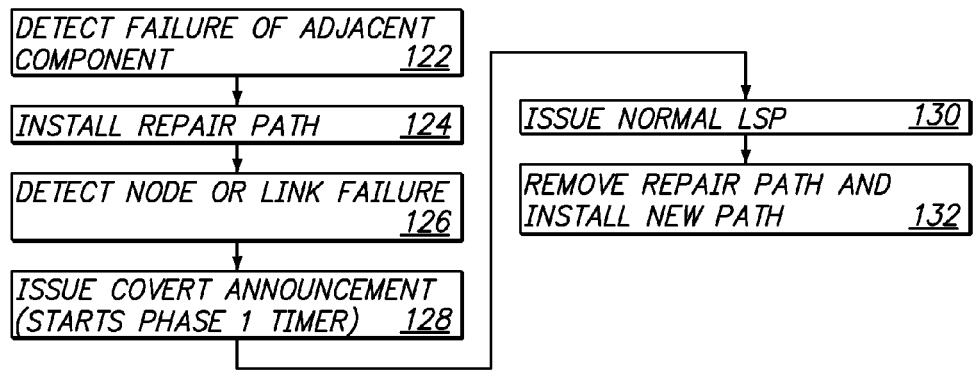
FIG. 7 is a flow diagram showing in more detail a transition repair strategy.

FIG. 7 is a flow diagram illustrating in more detail the method steps undertaken at a neighboring node to the failed component, for example node A shown in FIG. 1. In block 122 the neighboring node detects failure of an adjacent component. The manner in which failure is detected will be well known to the skilled person and will be dependent upon the specific nature of the detecting node and the adjacent component. In block 124 the detecting node installs the appropriate pre-computed repair path. In block 126 the detecting node detects whether the failure is a node or a link failure as discussed in more detail above. In block 128 the detecting node issues a covert announcement of the failure and type: node or link, and starts the phase 1 timer.

In block 130, on expiry of the phase 1 timer the neighboring node issues a normal LSP advertising the failure. In block 132, on expiry of the phase 3 timer the neighboring node removes its repair paths and installs the new paths. The new paths are, in an optimization, pre-computed during the phase 1, 2 and 3 periods.

Figure 8:
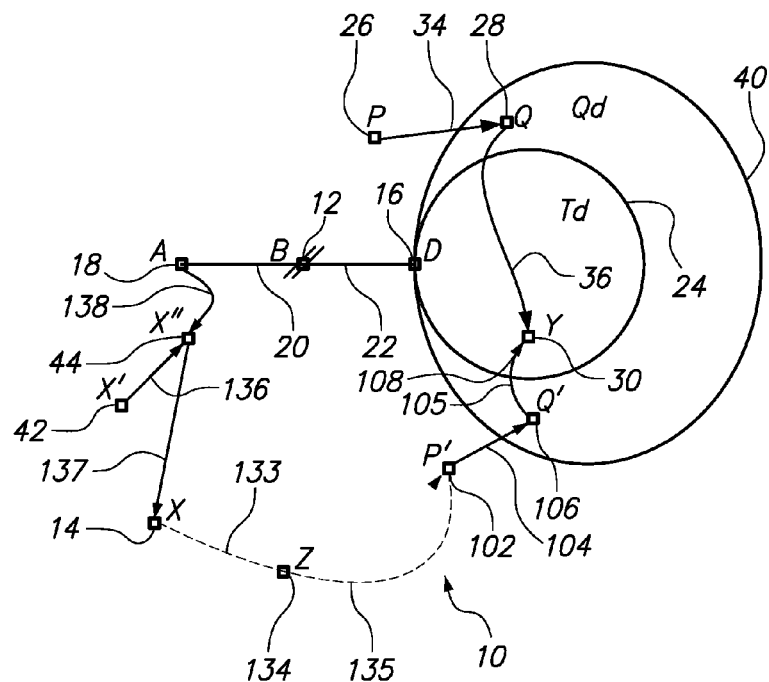
FIG. 8 is a representation of the network of FIG. 1 showing transition and repair paths removed and new paths installed.

FIG. 8 depicts an illustrative network diagram showing the network in its final state in which the transition tunnels for X, X', X" and the repair paths from node A have been removed. For example it will be seen that node X forwards to node Y via link 133, node Z, reference 134, link 135 and then nodes P', Q' and Y. Node X' forwards to node X" via link 136 and node X" forwards to node X via link 137 after which the same route is followed. Node A forwards to node X" via link 138 which again forwards via node X and so forth.

The above discussion assumes that it is possible to establish repair paths to all the necessary targets ("primary repair paths") but it may be possible otherwise that targets unreachable via a primary repair path can be repaired from at least one other target which can be reached from the cooperating or neighboring node ("secondary repair path"). Accordingly if a cooperating node cannot install primary repair paths for some set of targets then it should install a transition tunnel with an end point of node A, the neighboring node to the failed component, for the set of nodes reachable through otherwise unreachable targets on the assumption that A will have computed appropriate secondary repair paths. The phase 3 timer is required to ensure that the neighboring node (e.g. node A) does not remove its repair paths before the cooperating nodes have removed their transition tunnels and replaced them with their new paths, as otherwise any cooperating nodes relying on secondary repair paths via the neighboring node would continue to forward leading to the potential formation of loops. However neighboring nodes with a complete set of primary repair paths can replace their repair paths with the new path at the end of phase 1. This is because if the neighboring node has a complete set of primary repair paths then it can be shown that all of the other nodes must as well such that none of the cooperating nodes will be relying on node A to provide secondary repair paths and tunneling to node A. Indeed this can be adopted as an optimization whereby all traffic from cooperating nodes is tunneled to the neighboring node that issued the covert announcement whose repair paths are then relied on, although this increases the encapsulation burden on the neighboring node. As discussed above, allocation of which repair path or transition path to use for a given packet is achieved by assessing which target node it would have traversed if the failed component were operational, and sending it down the tunnel to that target node. If traffic is being tunneled only to the neighboring node then its own allocation routine can be relied on and it is only necessary at a cooperating node to identify the destination which previously would have been reached by traversing the failed component and tunneling all traffic for that destination to a neighboring node with repair paths installed.

In the case of multiple concurrent failures then the cooperating node will receive multiple covert announcements. In the event that the covert announcements are in relation to the same failure then the transition routes can be installed as described above. However if it is established that more than one component has failed then the cooperating node proceeds to phase 3—in other words it installs its new path in a conventional manner.

Although the discussion above is in relation to notification of a failed component it is also possible that the component is untraversable or otherwise undergoes a change of state for other reasons such as modification of a link cost, introduction of a new or repaired link or node to service, or withdrawal of a link or node from service.

In the case of a modified link cost, the covert failure announcement is replaced by a covert link change announcement. Cooperating routers then install transition tunnels under the same conditions as described above but based on new next hops as a result of the modification in link costs rather than removal of the link (or associated components) altogether. Those routers that need to install a transition tunnel perform an SPF using the lower of the new and old link cost, and then install the transition tunnels they will need as if the link had failed. Repair tunnels are not required from the neighbors of the link because it is still up.

Where a link is withdrawn this is equivalent to setting the link cost to infinity and the system follows the same process as the corresponding link cost modification approach described above. Neighboring nodes continue to forward across the link until the phase 3 transition is completed.

As regards withdrawal of a node, if this is announced by the node itself transition routes are installed as described above, however neighbors of the withdrawn node continue to forward through the withdrawn node until the phase 3 transition is completed.

Upon introduction of a link the method deals with this as for a corresponding link cost modification. Nodes adjacent to the link can use it immediately and do not need to introduce their own repair paths.

Upon introduction of a node, an additional transitional phase is required to allow the new node to acquire the complete LSP database, which phase is completed for example upon an appropriate timeout. Upon completion of the transition phase the new node issues a covert announcement and starts forwarding normally. All cooperating nodes enter phase 1 of a network transition and follow the method described above. The new node makes an overt announcement of its fully operational status on expiry of the phase 1 timer.

Where two changes start simultaneously, all cooperating nodes and neighboring nodes proceed directly to phase 3, that is, normal installation of new paths is implemented.

It will be noted that the transition route approach described above can be implemented in conjunction with an incremental cost change advertisement approach of the type described in Shand. A selection of the appropriate mechanism can be made by the appropriate node. In the case of a link cost change the node being managed can impose the selected strategy on the rest of the network. In the case of a failure of a link or node, the cooperating neighbor nodes can select the appropriate strategy.

The mechanism by which the transition routes and repair paths are stored and implemented will be well known to the skilled person such that a detailed description is not required here. The routes are calculated in the existing routing code as a natural extension of the computation as carried out in any event. Although in the above discussion the transition routes are pre-computed, alternatively they can be computed upon receipt of the covert announcement. The various databases and tables storing the routing and forwarding information can be updated in any appropriate manner, for example varying appropriate data fields or pointers in database entries or by storing repair paths along with normal entries. The above discussion assumes that each node is capable of acting as a tunnel termination point and performing directed forwarding or an equivalent mechanism which may not be the case for all routers. To the extent that a node is available to carry out the appropriate functions this can be advertised by modifying the appropriate fields in the advertisement and where this is not present, it can be inferred that the router sending an advertisement does not support tunnel termination. This can be a further factor in selecting a desired intermediate node.

Similarly the additional code required to implement the method, such as recognition and processing of the covert announcement, and carrying out the relevant steps on expiry of the respective timers will be apparent to the skilled reader and will be a simple modification of the existing code. The timers themselves can use existing network wide timer capability. In relation to propagation of non-standard packets such as covert announcements, this can be incorporated in any appropriate protocol. For example in the IS-IS protocol the covert announcement can be issued via a suitable TLV in an LSP.

4.0 Implementation Mechanisms—Hardware Overview

Figure 9:
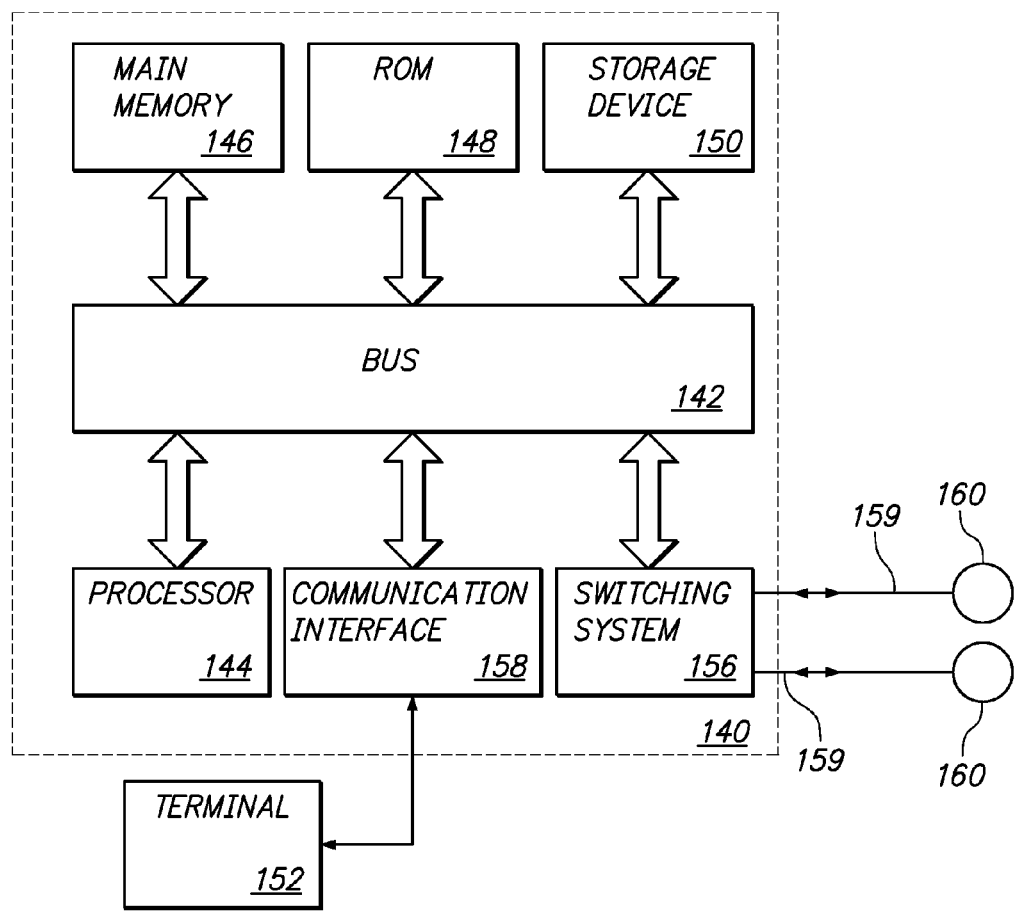
FIG. 9 is a block diagram that illustrates a computer system upon which a method for determining a repair strategy may be implemented.

FIG. 9 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 also may be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a cooperating or neighboring node the above described method of constructing a transition route around a link 159 or the router 160 connected to it or another router. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

Although the computation of the repair path and transition route is discussed as taking place at the relevant node it can equally occur at a remote node which then downloads paths to all nodes. Although tunneling and directed forwarding are discussed as technique for forwarding packets to or from the intermediate node, any appropriate packet routing mechanism can be adopted as long as it is supported by the relevant nodes, for example loose or strict source routing. The method steps set out can be carried out in any appropriate order, for example P and Q space can be constructed in any order or indeed simultaneously.

It will be appreciated that any appropriate routing protocol can be used such as Intermediate System—Intermediate System (IS-IS) or Open Shortest Path First (OSPF). Similarly any appropriate network can provide the platform for implementation of the method.

Although computation of the transition routes is described above as being carried out in real time upon receipt of a covert announcement it will be recognized that alternatively transition routes can be pre-computed for all possible failures and instituted immediately upon receipt of a covert announcement of a specific failure which would shorten phase 1, but increase computation and storage requirements. Similarly it will be seen that the system will work irrespective of whether the network is composed entirely of cooperating nodes or whether it has a mixed cooperating and non-cooperating nodes. In the cases that there were only cooperating nodes in a network then phase 2 would not be required as it would not be necessary to accommodate the installation in non-cooperating routers of normal updated paths such that, once all cooperating nodes had installed their transition routes the system could immediately progress to phase 3.

What is claimed is:

1. A method of constructing a route in a data communication network comprising the steps of: in response to receiving a notification, identifying a transition of a first component of the data communication network, at a non-neighboring node of the first component from a neighboring node of the first component, constructing, at the non-neighboring node, a tunnel from the non-neighboring node to the neighboring node; wherein the non-neighboring node is not directly connected to the neighboring node; wherein the neighboring node of the first component is configured to build a repair path around the first component; wherein the non-neighboring node is configured not to build the repair path around the first component, and is configured to use the tunnel and the repair path of the neighboring node to forward data around the first component; wherein the method is performed by one or more computing devices.

2. A method as claimed in claim 1, further comprising constructing another repair path around the first component from an adjacent component upon detection of the first component transition.

3. A method as claimed in claim 2, wherein the tunnel from the non-neighboring node is constructed for a destination that was reachable from the non-neighboring node via the first component.

4. A method as claimed in claim 2, wherein the tunnel from the non-neighboring node is constructed for a destination for which a next hop changes upon receipt of the notification identifying the first component transition.

5. A method as claimed in claim 2, wherein the tunnel from the non-neighboring node is removed upon expiry of a transition period.

6. An apparatus for constructing a route in a data communications network, the apparatus comprising: one or more processors; a network interface communicatively coupled to the processors and configured to communicate one or more packet flows among the processors and a data communications network; a computer readable storage medium storing one or more sequences of instructions for constructing a route in the data communication network, which instructions, when executed by the one or more processors, cause the one or more processors to perform: in response to receiving a notification identifying a transition of a first component of the data communications network, at a non-neighboring node of the first component from a neighboring node of the first component, constructing, at the non-neighboring node, a tunnel from the non-neighboring node to the neighboring node; wherein the non-neighboring node is not directly connected to the neighboring node; wherein the neighboring node of the first component is configured to build a repair path around the first component; wherein the non-neighboring node is configured not to build the repair path around the first component, and is configured to use the tunnel and the repair path of the neighboring node to forward data around the first component.

7. An apparatus of claim 6, further comprising instructions which, when executed, cause the one or more processors to perform: constructing another repair path around the first component from an adjacent component upon detection of the first component transition.

8. An apparatus of claim 7, wherein the tunnel from the non-neighboring node is constructed for a destination that was reachable from the non-neighboring node via the first component.

9. An apparatus of claim 7, wherein the tunnel from the non-neighboring node is constructed for a destination for which a next hop changes upon receipt of the notification identifying the first component transition.

10. An apparatus of claim 7, wherein the tunnel from the non-neighboring node is removed upon expiry of a transition period.

11. A non-transitory computer-readable storage medium storing one or more instructions which, when executed by one or more processors, cause the one or more processors to perform: in response to receiving a notification identifying a transition of a first component of a data communications network, at a non-neighboring node of the first component from a neighboring node of the first component, constructing, at the non-neighboring node, a tunnel from the non-neighboring node to the neighboring node; wherein the non-neighboring node is not directly connected to the neighboring node; wherein the neighboring node of the first component is configured to build a repair path around the first component; wherein the non-neighboring node is configured not to build the repair path around the first component, and is configured to use the tunnel and the repair path of the neighboring node to forward data around the first component.

12. A computer-readable storage medium as claimed in claim 11, further comprising instructions which, when executed, cause the one or more processors to perform: constructing another repair path around the first component from an adjacent component upon detection of the first component transition.

13. A computer-readable storage medium as claimed in claim 12, wherein the tunnel from the non-neighboring node is constructed for a destination that was reachable from the non-neighboring node via the first component.

14. A computer-readable storage medium as claimed in claim 12, wherein the tunnel from the non-neighboring node is constructed for a destination for which a next hop changes upon receipt of the notification identifying the first component transition.

15. A computer-readable storage medium as claimed in claim 12, wherein the tunnel from the non-neighboring node is removed upon expiry of a transition period.

\* \* \* \* \*